E. P. GLEASON,

Assignor to E. P. GLEASON MANUFACTURING CO.

GAS LIGHTING TORCH.

No. 10,159. Reissued July 18, 1882.

Witnesses:
Henry F. Parker
James A. Hunter

Inventor:
Elliott P. Gleason

N. PETERS, Photo-Lithographer, Washington, D. C.

UNITED STATES PATENT OFFICE.

ELLIOTT P. GLEASON, OF BROOKLYN, ASSIGNOR TO E. P. GLEASON MANUFACTURING COMPANY, OF NEW YORK, N. Y.

GAS-LIGHTING TORCH.

SPECIFICATION forming part of Reissued Letters Patent No. 10,159, dated July 18, 1882.

Original No. 241,798, dated May 24, 1881. Application for reissue filed June 19, 1882.

*To all whom it may concern:*

Be it known that I, ELLIOTT P. GLEASON, of Brooklyn, Kings county, New York, have invented, made, and applied to use a certain Improvement in the Construction of Gas-Lighting Torches; and I do hereby declare that the following is a full, clear, and correct description of the same, reference being had to the accompanying drawings, making part of this specification, and to the letters of reference marked thereon, in which—

Figure 1:
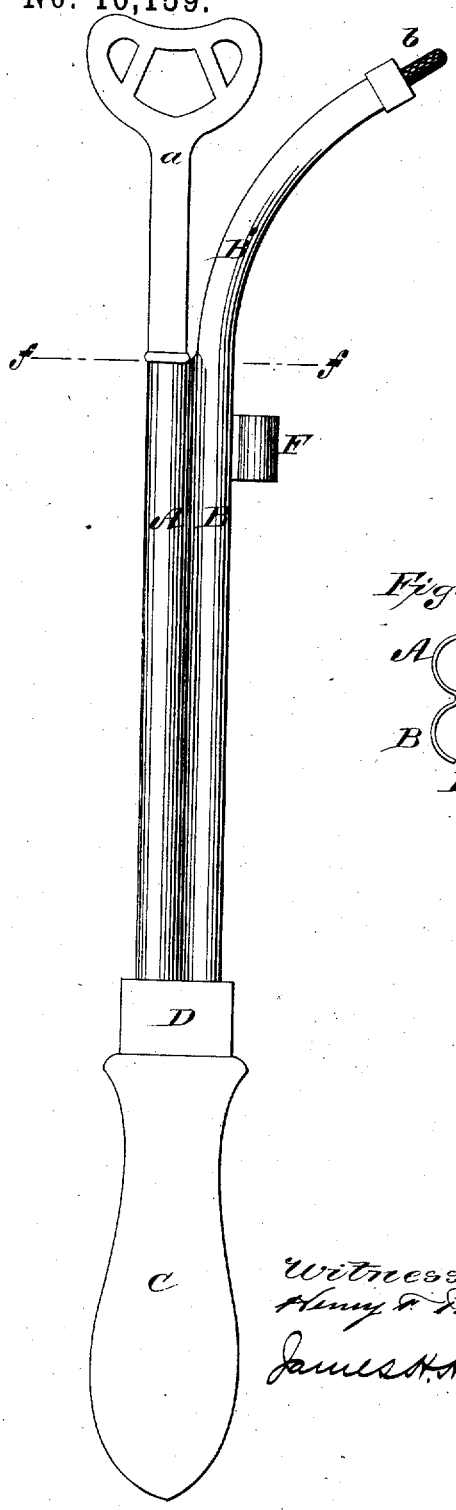
Figure 2:
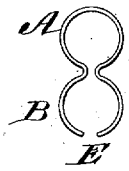
Figure 3:
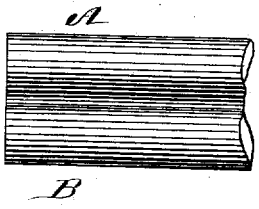

Figure 1 is a view of a gas-lighting torch constructed in accordance with my improvement. Fig. 2 is a cross-section thereof, and Fig. 3 is a portion of the exterior of the two tubes composing the torch.

Heretofore, in the manufacture of gas-lighting torches of the class to which the present invention relates, a single tube in which the taper was contained has been combined with a separate tube, upon the upper end of which a key employed to turn the cock of the gas-chandelier was placed, either by continuing the metal of which the tube was composed or forming the key separately and uniting it to this tube. In the use of a gas-lighting torch so constructed it has been found that where the cock of the gas-chandelier turned with difficulty or required considerable effort to turn it the key supported by the single tube was apt to be twisted or turned out of position, and the tube supporting it was apt to be turned out of shape, and in some instances broken. To re-enforce this tube and strengthen it to withstand the strain arising from difficulty in turning the cock of the gas-chandelier is the object of the present invention.

To enable those skilled in the art to make and use my invention, I will describe the same.

A shows the tube to support the key *a;* B, the tube to receive the taper *b*. C is a handle for supporting both tubes, the bases of which are inserted firmly in a collar, D, upon the upper end of the handle.

In the manufacture of the tube A, which is usually done by passing the metal through a series of dies properly constructed, the metal is continued to form the sides of the tube B, leaving only the opening E for the passage of the taper F. The key *a*, with its support, is then attached to the upper end of the tube A, and the tubes A and B so formed are inserted in the collar D and handle C. With this construction a separate curved tube, B′, is added to support and guide the end of the taper, the junction being made at the line *f f*, Fig. 1, at which part of the torch is also added the key *a*, such key being soldered or otherwise secured in any convenient way in the top of the tube A.

Having now set forth my invention, what I claim as new is—

1. A gas-lighting torch in which the key and taper tubes are constructed of one and the same piece of metal, substantially as described.

2. The combination of a key-tube, A, and a taper-tube, B, constructed of one and the same piece of metal, with a curved tube, B′, for the support and guide of the end of the taper, a key, *a*, and a handle, C, substantially as described.

ELLIOTT P. GLEASON.

Witnesses:
JAMES H. HUNTER,
BERTIE H. MARSHALL.